United States Patent Office

2,891,019
Patented June 16, 1959

2,891,019

PROCESS FOR DIMENSIONALLY STABILIZING CELLULOSE AND AQUEOUS COMPOSITION USED THEREFOR

Walter P. Ericks, Lockport, N.Y., assignor to The Upson Company, Lockport, N.Y.

No Drawing. Application April 29, 1954
Serial No. 426,599

21 Claims. (Cl. 260—17.2)

The present invention relates to a process for the treatment of cellulose materials and to compositions employed in such a process. More particularly, it relates to the treatment of cellulose materials to improve their dimensional stability upon being subjected to humidity variations in the atmosphere.

In my prior Patents 2,629,648 and 2,629,701 and in my copending application Serial No. 103,526, filed July 7, 1949, now Patent No. 2,692,183, I have disclosed that cellulose materials may be greatly improved as to dimensional stability by impregnating them with a wide variety of organic compounds having a plurality of hydroxyl groups attached to different carbon atoms in the molecule, with at least one of the hydroxyl groups being part of a carboxyl group. However, certain disadvantages are encountered in the use of many of the compounds of this type and the present invention deals with a process of dimensionally stabilizing cellulose materials by which these disadvantages are overcome.

Many of the compounds disclosed by my prior patents are insoluble or only slightly soluble in water. Therefore, to use them as impregnants of cellulose materials, it has often been necessary to dissolve them in a suitable volatile organic solvent or aqueous solution of the solvent. Such solvents are expensive and complicated procedures must be devised for their recovery for subsequent re-use. Also, many of the volatile organic solvents are highly inflammable in nature and create dangerous fire hazards. Moreover, many of the volatile solvents, which may be employed, are relatively toxic in nature and, if they escape to the atmosphere they create a health hazard.

Another serious drawback to the use of many of the compounds of my prior patents and copending application is that they are quite acid in nature, often having a pH of 2 to 3, and thus are quite corrosive. They will readily attack metal containers in which they are shipped and seriously damage the equipment in which they are employed.

Accordingly, it is a primary object of the present invention to provide an inexpensive, non-hazardous process for dimensionally stabilizing cellulose materials against changes in relative humidity.

A further object of the invention is to provide novel, non-corrosive compounds and compositions of matter for use in such a process.

Other and further objects of the invention will be apparent from the following detailed description thereof.

The present invention is applicable to any material having the characteristic cellulose structure, which may be expressed by the structural formula:

Thus, the cellulose of the material being stabilized may be in its original fibrous form of nature or it may have been dissolved in an appropriate reagent and then regenerated so long as the cellulose structure is present in the final material.

Also, it should be pointed out that the invention is not limited to any particular physical form. Such widely divergent materials as paper sheets, cardboard, structural fiber board, woven cloth of natural or regenerated cellulose fibers, wood products whether whole or laminated, and regenerated cellulose sheets (cellophane) may be dimensionally stabilized against humidity changes by the present process and compositions. The greatest expansion and contraction due to change in relative humidity will always occur in a direction perpendicular to that at which the major portion of the cellulose molecule are oriented. In the case of natural fibers, this will be longitudinally thereof and in the case of regenerated cellulose sheets, it will be in the direction of the travel of the sheets through the machine on which they are formed.

I have found that a water solution may be used to impregnate such cellulose materials with a stabilizer comprising an organic compound having a plurality of hydroxyl groups in the molecule, at least one of which is present as part of a carboxyl group, by adding ammonia or a volatile amine to the stabilizer, even if the stabilizer, itself, is insoluble or only very sparingly soluble in water or is very corrosive in water solution. By a volatile amine is meant a low molecular weight aliphatic amine having a boiling point less than 100° C. and as exemplary of such amines may be mentioned methyl amine, dimethyl amine, trimethyl amine, ethyl amine, diethyl amine, triethyl amine, and propyl amine. When ammonia is referred to hereinafter it should be understood to include both ammonia, itself, and the volatile amines.

Ordinarily, the theoretical amount of ammonia will be added to satisfy the carboxyl groups present in the stabilizer compound so as to cause complete conversion to the ammonium salt. The present invention is not to be limited to such a procedure, however, since it has been found that in many cases considerably less ammonia than the theoretical amount may be added and still provide relatively non-corrosive aqueous solutions of a strength sufficient to impregnate the necessary amount of stabilizer into the material being treated. This amount will, of course, vary with the nature of the stabilizer compound being employed and therefore no definite limits may be set as to the amount of ammonia to be used. In general, it may be stated that sufficient ammonia should be added to a stabilizing compound having a pH of 2–3 in aqueous solution to bring its pH at least to 4 and to render it sufficiently soluble in water to provide the desired concentration for impregnation purposes.

The cellulose material being treated may be impregnated with the aqueous solution of the ammonia salt of the stabilizing compound by any suitable means, but immersion in the solution has been found the best and most practicable procedure in the majority of cases. Most cellulose materials take up the solutions readily and complete impregnation is usually realized within 1 to 8 minutes with 4 minutes being about the average time required.

After complete impregnation, the cellulose material is heated to dry the product and drive off ammonia. It is believed that for the most part, the original stabilizer

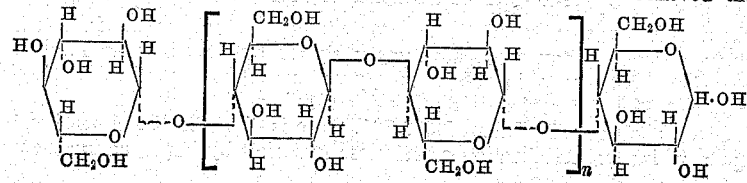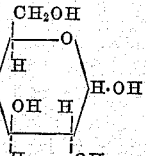

compound is regenerated in the final product but it should be pointed out that this may not occur in all cases to the exclusion of other side reactions. It is believed entirely possible that with certain of the compounds, amide or imide formation may occur in some degree. In any event, it has been found that for the most part, the final products have the same degree of dimensional stability to humidity change as would have been realized if the stabilizer compound were added in its original form through the use of non-aqueous solvents.

The temperature to which the cellulose material is heated after impregnation is not critical but it should be over 100° C. to drive off water rapidly and if heated above approximately 130–135° C., the side reactions mentioned above appear to be favored. A temperature range of 108–122° C. is preferable in most instances.

The concentration of the aqueous solutions employed will, of course, be controlled by the amount of stabilizer to be introduced into the cellulose material and it is an easy matter to determine how much of the solution will be absorbed thereby. In general, it may be said that effective dimensional stabilization may be accomplished by incorporating in the cellulose material an amount of stabilizing compound constituting from about 2 to 50% of the weight of the impregnated product based upon the weight of the oven dried final product. The exact quantity to be incorporated into the cellulose material will be determined by the type of material, the type of stabilizing compound employed and the amount of the normal expansion and contraction, which it is desired to remove.

As disclosed in my earlier patents and application, the fixation of the stabilizing compounds in the cellulose material can be enhanced by employing them in combination with thermosetting resins, although the inclusion of such resins is not an essential feature of the invention. For use in the present process it is, of course, necessary that the thermosetting resins be soluble, or at least readily dispersible, in water during an early stage in their production. A urea-formaldehyde type resin has been found very suitable for use in the present process and water soluble forms are readily available on the open market. One such resin is known to the trade as Urac 180.

Another water soluble thermosetting resin which may be used to advantage is that formed by the condensation of melamine with formaldehyde and again such a resin is available on the open market, one particular form being known to the trade as Melmac 405.

A suitable water soluble phenol-formaldehyde resin may be prepared by boiling for 30 minutes 100 parts of phenol, 108 parts of 37% formaldehyde and 2.5 parts of potassium hydroxide. After the addition of 72 parts of water, the mixture is cooled and there is added 2.5 parts of ammonium dichromate dissolved in 36 parts of water with a sufficient quantity of ammonium hydroxide solution being added to prevent precipitation of resin. The product is a dark green solution containing 45% resin.

Another water soluble resin of the phenolic type may be prepared by heating for 11 minutes 223 parts of 97% cresylic acid with 292 parts of 37% formalin and 6 parts of diethylamine until the temperature reaches 84° C. At this point, the reaction mixture is cooled and the resin layer separated from the water layer. The resin prepared in this manner is soluble in water when made alkaline with ammonia or water soluble organic amines.

The amount of thermosetting resin used may be varied within a considerable range, for example, between 5 and 50% of thermosetting resin in the final product based on the dry weight thereof.

Another aspect of the present invention is the addition of various waterproofing agents in emulsion form to the aqueous solutions of the stabilizer. An emulsion of microcrystalline paraffin wax, which may contain 50% solids, has been found to be particularly suitable. The wax is kept in suspension by an emulsifying agent, which may be of the anionic type such as triethanolamine oleate, the cationic type such as didodecyl monomethyl pyridinium chloride or the nonionic type such as nonaethylene glycol laurate.

The latexes of natural or artifical rubbers also serve effectively as waterproofing agents.

In the use of stabilizing compositions containing waterproofing agents, the water solutions of the stabilizers appear to readily and swiftly penetrate to the interior of the cellulose material being treated whereas the waterproofing agents collect on the surface and are affixed at this point by the subsequent heating step. The final products have a greatly increased resistance to water, absorbing far less than is the case with untreated products.

The amount of waterproofing agent employed is not particularly critical but usually will be in an amount sufficient to deposit on the final product about 1 to 5% based on the dry weight of the product.

The nature of the stabilizing compound, itself, may vary widely but, as stated earlier, it will comprise the ammonia salt of an organic compound having a plurality of hydroxyl groups attached to different carbon atoms in the molecule, with at least one of the hydroxyl groups being part of a carboxyl group. In my Patent 2,629,648, I disclosed that polycarboxylic acids, both aliphatic and aromatic, exert a dimensional stabilizing effect on cellulose materials.

Many of these acids, particularly the aliphatic acids of relatively low molecular weight, are soluble in water, but since they are quite corrosive in nature, it represents a decided advantage to employ them at least partially converted to their ammonium salts. Moreover, a number of the aromatic and high molecular weight polycarboxylic acids are insloluble or only sparingly soluble in water and it has been found that these acids may be, without exception, rendered sufficiently water soluble to permit impregnation in water solution by converting them to their ammonium salts. As examples of polycarboxylic acids, which exert a strong stabilizing action and which are most advantageously employed in water solution as their ammonium salt, may be listed the following: adipic acid, sebacic acid, azelaic acid, phthalic acid, eleostearic acid and isosebacic acid.

In addition to the above, there is a particular type of polycarboxylic acid, which is not specifically mentioned in my Patent 2,629,648, but which is encompassed within the scope thereof, which is apt to be quite insoluble in water and best employed in the form of an ammonium salt in connection with the process of the present invention. These are the so-called adducts, which are formed in accordance with the well-known Diels-Alder reaction whereby a polycarboxylic acid, or its anhydride, in which the carboxyl groups are attached to adjacent carbon atoms are reacted with compounds containing conjugated double bonds in the molecule. These last mentioned compounds may themselves be carboxylic acids in which case there will be formed acids having at least three carboxyl groups. As examples of such adducts may be mentioned the reaction product of eleostearic acid and maleic anhydride and the adduct formed by reacting abietic acid with maleic anhydride.

In my copending application Serial No. 103,526, now Patent No. 2,692,183, I disclosed the hydroxy carboxylic acids as a group for the dimensional stabilization of cellulose materials. Again, many of these compounds are relatively soluble in water but a number, particularly those which are aromatic in nature, and the high molecular weight aliphatic hydroxy acids are not sufficiently soluble to be impregnated into the cellulose material in water solution. As examples of hydroxy acids, which may most advantageously be employed as ammonium salts in the present process may be mentioned: dihydroxy stearic acid and salicylic acid.

In Patent 2,629,701, there is disclosed the dimensional stabilization of cellulose materials by impregnating them with partial esters formed by reacting aliphatic polyhydric alcohols with a polycarboxylic acid in a manner fully set forth therein. When dihydric and dicarboxylic acids are employed, they will ordinarily be reacted together in substantially equimolecular proportion and the reaction carried on until approximately one half of the hydroxyl groups of the dihydric alcohols have been reacted with half of the carboxyl groups of the dicarboxylic acids as determined by the reduction in the original acid number in the mixture to approximately one half. When the polyhydric alcohol contains more than two hydroxyl groups, or the carboxylic acid contains more than two carboxyl groups, or when both reactants have more than two reactive groups, the same general rule holds true. There should be at least one unreacted or free hydroxyl group on the residue of the polyhydric alcohol and at least one unreacted or free carboxyl group on the residue of the polycarboxylic acid in the molecule of the resulting partial ester. It will be apparent that with polyhydric alcohols having more than two hydroxyl groups, the resulting partial ester may contain two or more hydroxyl groups on the residue of the polyhydric alcohol, and similarly, with polycarboxylic acids having more than two carboxyl groups there may be two or more carboxyl groups on the residue of the carboxylic acid. As illustrative of stabilizing compounds of this type, which may best be used to stabilize cellulose materials in accordance with the present invention in the form of their ammonium salts may be mentioned the following: polyethylene glycol 200-adipic acid monoester, polyethylene glycol 400-phthalic acid monoester, polyethylene glycol 200-phthalic acid monoester, ethylene glycolsebasic acid monoester, glycerol-sebacic acid monoester, 2-butyl-1,4-diol-phthalic acid monoester, 2-ethylhexanediol-1,3-phthalic acid monoester, ethylene glycol-azelaic acid monoester, propylene glycol-azelaic acid monoester, and diethylene glycolsebacic acid monoester.

In addition to the above enumerated partial esters, there may be employed the partial esters of a polyhydric alcohol and an adduct, such as that formed by the reaction between abietic acid and maleic anhydride.

Also, it should be pointed out that the ammonium salts of single partial esters may be employed or the ammonium salts of a mixture of partial esters.

There is another group of compounds, which are particularly suitable to the dimensional stabilization of cellulose materials, but which are not specifically mentioned in my earlier patents or application, although clearly falling within the intended scope of Patent 2,629,648. These are esters formed by reacting an excess of a polycarboxylic acid with a polyhydric alcohol so that at least two of the hydroxyl groups of the alcohol are completely esterified but leaving free carboxyl groups from unsatisfied portions of the polycarboxylic acid molecules. When reacting a dihydric alcohol with a dicarboxylic acid, the theoretical proportion will, of course, be 2 mols of acid to 1 mol of the alcohol. The products of the reaction may be referred to as polyacid esters since at least 2 molecules of acid are involved, but they are also polycarboxylic acids since there are always at least two free carboxyl groups in the final compound.

Because of the low solubility in water of many of the aromatic and high molecular weight members of this group of compounds and the low pH of such as are water soluble they are particularly adaptable to use in accordance with the present process whereby they are impregnated into cellulose materials in the form of their ammonium salts. One particularly valuable compound of the present type for use in the instant process is the ammonium salt of ethylene glycol diphthalic acid ester formed by reacting 2 mols of phthalic anhydride with one mol of ethylene glycol.

Examples of other polyacid esters of polycarboxylic acids and polyhydric alcohols, which are suitable for use in the process of the present invention in the form of their ammonium salts, are the following: the diadduct ester formed by the reaction of propylene glycol with an excess of abietic acid-maleic anhydride adduct, diethylene glycol diphthalic acid ester, diethylene glycol dimaleic acid ester, propylene glycol diadipic acid ester, ethylene glycol diadipic acid ester, diethylene glycol diadipic acid ester, propylene glycol diphthalic acid ester, butanediol 1,4-diphthalic acid ester, and the diadduct ester formed by reacting an excess of maleic anhydride-abietic acid adduct with diethylene glycol.

The following examples are set forth as illustrative of, but not as limiting, the present invention.

A. AMMONIUM SALTS OF POLYCARBOXYLIC ACIDS

*Example 1*

21, 14 and 7% water solutions of diammonium adipate, each also containing 3, 2 and 1%, respectively, of emulsified wax, were impregnated into 0.060" thick sheets of unsized cellulose fiber boards manufactured from news stock. After drying and heating for 1 hour at 108 deg. C. the sheets contained 25, 14 and 9% impregnated solids and lost 72, 42 and 23% of their original expansion-contraction due to a relative humidity change of from 0 to 90%. The sheet containing 25% impregnated solids absorbed 35% water, based on the weight of the dried, impregnated board, while being immersed in water for 2 hours. The original fiber board absorbed 125% water when similarly treated.

*Example 2*

21, 14 and 7% of water solutions of diammonium sebacate each of which contained 3% emulsified wax were impregnated into cellulose fiber board. After heating for 1 hour at 108 deg. C. the boards contained 27, 17 and 10% of impregnated solids and lost 80, 60 and 34%, respectively, of their normal expansion-contraction. These sheets absorbed 21, 18 and 25% water, respectively, after soaking in water for 2 hours, while the original unimpregnated sheet absorbed 124% water.

*Example 3*

A 30% water solution of diammonium sebacate was impregnated into white pine wood samples of ¼" x 1½" x 12" dimensions. After oven drying for 2 hours at 108° C., the wood was found to contain 13% stabilizer.

Over a 12" length perpendicular to the grain, 38% of the expansion-contraction was removed. Over the ¼" thickness of the samples, 30% of the expansion-contraction was removed.

*Example 4*

Regenerated cellulose gabardine cloth was impregnated with a 20% water solution of diammonium sebacate. After evaporation of solvents and heating the samples contained 21% stabilizer. 8% of the original expansion-contraction was removed in the direction parallel to the bolt hem and 60% was removed in the perpendicular direction.

*Example 5*

21, 14 and 7% water solutions of the diammonium salt of azelaic acid, each of which contained 1% emulsified wax, were impregnated into cellulose fiber board, which after heating at 108° C. for 1½ hours yielded dried sheets containing, respectively, 29, 16 and 9% impregnated solids.

These sheets had lost 98, 59 and 22%, respectively, of the expansion-contraction resulting from a relative humidity change in the range of 0 to 90%.

*Example 6*

22% and 11% water solutions of the diammonium salt of azelaic acid were impregnated into a transparent, colorless cellophane film plasticized with glycerol. The film, on drying and heating, contained 31 and 20% stabilizer, respectively. 75% and 11%, respectively, of the original expansion-contraction due to changing relative humidity was removed perpendicular to the direction of molecular orientation, which resulted from formation of the film.

*Example 7*

A water solution of 15% of the diammonium salt of azelaic acid and 5% of water soluble urea-formaldehyde resin was impregnated into cellophane film. After drying and heating the sheet contained 20% of the original expansion-contraction.

*Example 8*

15, 10 and 5% water solutions of the diammonium salt of p-phthalic acid, each containing 1% of emulsified wax, were impregnated into cellulose fiber sheets. After heating, the dried sheets contained 22, 14 and 8% impregnated solids and they lost 51, 30 and 16%, respectively, of the expansion-contraction normally occurring on exposure to relative humidities ranging from 0 to 90%.

These sheets absorbed 21, 32 and 66% water, respectively, when subjected to water immersion for 2 hours, while the original unimpregnated sheet absorbed 142.9% water under identical conditions.

*Example 9*

21, 14 and 7% water solutions of the ammonium salt of o-phthalic acid containing 3, 2 and 1%, respectively, of emulsified wax, were impregnated into cellulose fiber sheets. After drying and heating, the sheets contained 31, 19 and 11% of impregnated solids and lost 45, 32 and 13%, respectively, of their original expansion-contraction over a relative humidity range of from 0 to 90%.

*Example 10*

Eleostearic acid-maleic anhydride adduct was prepared by heating 70 parts of eleostearic acid with 31 parts maleic anhydride at 130 deg. C. for 3½ hours. 30, 15, 7.5 and 4% water solutions of the triammonium salt of the adduct, so prepared, were impregnated into cellulose fiber paper sheets.

The sheets, on drying and heating, contained 32, 22, 13 and 7% stabilizer, and lost 62, 44, 38 and 18%, respectively, of the expansion-contraction due to a relative humidity change of from 0 to 90%.

*Example 11*

30, 15 and 7.5% solutions of diammonium isosebacate were impregnated into cellulose fiber sheets. On drying and heating, the sheets contained 39, 22 and 13% stabilizer, and were found to have lost 76, 44 and 20%, respectively, of expansion-contraction due to changing relative humidity.

The isosebacic acid used in this example was purchased on the open market and was not in pure form. However, it consisted mainly of alpha-ethyl suberic acid.

*Example 12*

A charge composed of 2410 parts of commercial abietic acid and 865 parts of maleic anhydride was heated in a vessel until the reactants melted. Stirring and heating at 150 deg. C. was then maintained for 1½ hours. The maleic anhydride-abietic acid adduct which formed in the course of this reactin was an amber colored, brittle resin. A 30% solution of the ammonium salt of this adduct was prepared by dissolving 90 parts of the adduct described in this example in a mixture composed of 55 parts of ammonium hydroxide solution (29% $NH_3$) and sufficient quantity of water. Cards made from kraft pulp and impregnated with the above solution and subsequently heated at 108–130° C. possessed improved hardness and dimensional stability.

B. AMMONIUM SALTS OF HYDROXY CARBOXYLIC ACIDS

*Example 13*

Aqueous solutions containing 20% and 10% of the ammonium salt of dihydroxy stearic acid were impregnated into cellulose fiber board sheets. After drying and heating for 1 hour at 108 deg. C., the sheets contained 18 and 11%, respectively, of the stabilizer and lost 33 and 19%, respectively, of the original expansion-contraction. The stabilized sheets absorbed 20 and 33% water, respectively, after soaking in water for 2 hours, while the original unimpregnated sheet absorbed 111%.

*Example 14*

A 5% water solution of the ammonium salt of dihydroxy stearic acid was impregnated into 0.060" thick unsized cellulose fiber board sheets. After drying and heating, the sheets contained 10% stabilizer, and were found to have had 31% of the original expansion-contraction removed. These sheets absorbed 49% water during a 2 hour water immersion period, while the original sheet absorbed 111% of water.

*Example 15*

Unsized, 0.060" thick, cellulose fiber sheets were impregnated with 30, 15 and 7.5% water solutions of ammonium salicylate. After drying and heating for 1 hour at 108 deg. C., the sheets contained 44, 26 and 13%, respectively, of the stabilizer and they lost 78, 37 and 24%, respectively, of their original expansion-contraction.

*Example 16*

20% and 10% aqueous solutions of ammonium salicylate containing 10 and 5%, respectively, of water soluble urea-formaldehyde resin were impregnated into cellulose fiber board sheets. After drying and heating, the sheets contained 42 and 24%, respectively, of impregnated solids and the tests showed that 62 and 39%, respectively, of the normal expansion-contraction was removed.

*Example 17*

20 and 10% water solutions of ammonium salicylate containing 15 and 7.5%, respectively, water soluble phenol-formaldehyde resin, were impregnated into cellulose fiber sheets. After drying and heating the sheets contained 60 and 37% impregnated solids, and they lost 87 and 57%, respectively, of the original expansion-contraction.

C. AMMONIUM SALTS OF PARTIAL ESTERS OF POLYHYDRIC ALCOHOLS AND POLYCARBOXYLIC ACIDS

*Example 18*

A 21% water solution of the ammonium salt of polyethylene glycol 200-adipic acid monoester, which also contained 1% emulsified wax, was impregnated into unsized 0.060" cellulose fiber board. After drying and heating at 108° C., the board contained 34% stabilizer and lost 74% of its normal expansion-contraction characteristics.

The monoester of this example, and also those to follow, were prepared according to the methods described in my U.S. Patent No. 2,629,701.

*Example 19*

A 21% water solution of the ammonium salt of polyethyle glycol 400-phthalic acid monoester, which also contained 1% emulsified wax, was impregnated into unsized cellulose fiber sheets. After drying and heating, the sheets contained 34% stabilizer and lost 66% of the original expansion-contraction under varying conditions of relative humidity between 0–90%.

Example 20

Aqueous solutions containing 29, 21, 14 and 11% of the ammonium salt of polyethylene glycol 200-phthalic acid monoester, and 1, 2, 0.5 and 1%, respectively, of emulsified wax were impregnated into cellulose fiber sheets. After drying and heating, the sheets contained 37, 27, 23 and 15% impregnated solids and lost 72, 50, 38 and 25%, respectively, of their original tendency to expand and contract, while being subjected to relative humidity variations from 0 to 90%.

Example 21

Aqueous solutions containing 21, 14 and 7% of the ammonium salt of ethylene glycol-sebacic acid monoester and 1% emulsified wax were impregnated into unsized cellulose fiber sheets. After drying and heating, the sheets contained 25, 15 and 9%, respectively, of the stabilizer, and lost 94, 58 and 39%, respectively, of their original expansion-contraction.

Example 22

A 30% water solution of the ammonium salt of ethylene glycol-sebacic acid monoester was impregnated into gabardine cloth woven from regenerated cellulose fibers. After drying and heating, the cloth sample contained 33% by weight of stabilizer and lost 46% of its original expansion-contraction in the direction parallel to the hem of the bolt and 90% of the expansion-contraction perpendicular to the hem of the bolt when subjected to relative humidity variations from 0 to 90%.

Example 23

A 30% water solution of the ammonium salt of glycerol-sebacic acid monoester was impregnated into regenerated cellulose gabardine cloth. The cloth contained 27% stabilizer after drying and heating and lost 35% of the original contraction-expansion in the direction parallel to the bolt hem and 85% in the perpendicular direction.

Example 24

A 15% water solution of the ammonium salt of glycerol-sebacic acid monoester, which also contained 2% polyethylene glycol 1500, and 2% water soluble melamine-formaldehyde resin was impregnated into gabardine cloth composed of regenerated cellulose fibers. After drying and heating, the cloth contained 18% stabilizer and lost 35% of the original expansion-contraction parallel to the bolt hem and 90% in the perpendicular direction.

Example 25

A 30% solution of the ammonium salt of glycerol-sebacic acid monoester was impregnated into white pine wood. After drying and heating, the wood contained 23% stabilizer, and showed improvement in dimensional stabilization by 76% in grain direction, 59% across grain direction and 81% in thickness.

Example 26

A water solution containing 12% of the ammonium salt of glycerol-sebacic acid monoester, 3% of the ammonia salt of ethylene glycol-sebacic acid monoester, 2% water soluble melamine-formaldehyde resin and 1% polyethylene glycol 1500, was impregnated into regenerated cellulose gabardine cloth. After drying and heating, the cloth sample contained 20% impregnated solids and lost 40% of its original expansion-contraction tendency in the direction parallel to the hem and 79% in the direction perpendicular to the hem.

Example 27

98 parts of maleic anhydride (1 mol), 148 parts of phthalic anhydride (1 mol) and 148 parts of adipic acid (1 mol), were dissolved by adding them in small portions to 600 parts of polyethylene glycol (3 mols), having an average molecular weight of 200, while stirring the glycol and maintaining the temperature of the liquid between 80–100° C. After the solution of the reactant components was effected, the stirring was continued and the temperature was elevated gradually to 150° C. and maintained at this level until the titration of a sample indicated that one-half of the original acidity was consumed in the formation of the mixed monoesters of the acids added.

A clear aqueous solution containing 30% of the mixed monoesters was prepared by dissolving 300 parts of the reaction product in 600 parts of water. When this aqueous solution was diluted with water to 15% solid concentration, it became turbid. It was clarified, however, by the addition of 6.5 ml. of concentrated ammonium hydroxide solution. Further dilution of the solution to 7.5% solids concentration caused the reappearance of turbidity, which was removed by the addition of 1 ml. of concentrated ammonium hydroxide solution.

This produced the solubilization of the partial esters in water without complete conversion of the partial esters to their ammonium salts and paper sheets prepared from news stock were impregnated with solutions so prepared. After drying and heating the samples at 108° C. for 1 hour, they contained 28, 23 and 14% of the partial mixed esters, and the evaluation of their dimensional changes between 0 to 90% relative humidity showed that they lost 51, 37 and 22%, respectively, of their normal contraction and expansion.

Example 28

86 parts of 2-butyne-1,4-diol were added to 148 parts of phthalic anhydride, which had previously been melted. A dark red solution formed at 90° C. and the reaction began to proceed spontaneously with little external heating required. The temperature was allowed to reach 175° C. After 10 minutes of heating, titrimetric analysis indicated that one-half of the original acidity had been consumed. The product was a tan colored, waxy solid.

The 2-butyne-1,4-diol-phthalic acid monoester prepared as described above was reacted with concentrated ammonium hydroxide solution to form the water soluble ammonium salt. A 20% water solution of the ammonium salt containing 3% emulsified wax, was impregnated into cellulose fiber sheets. After drying and heating, the sheets contained 30% solids and lost 49% of the original tendency to expand and contract while undergoing a 0 to 90% change in relative humidity. The sheets absorbed 32% water while being soaked for 2 hours while the original sheet absorbed 161% of water under identical conditions.

Example 29

292 parts of 2-ethylhexanediol-1,3 was added to 296 parts of phthalic anhydride which had previously been melted. The resulting straw colored solution was agitated and gently heated until the reaction began to proceed spontaneously. After stirring for 20 minutes at a temperature of 165° C., titration of a sample against standardized alkali solution indicated that one-half of the original acidity had been consumed in the reaction. The product was a viscous, yellow liquid.

The ammonium salt of 2-ethylhexanediol-1,3-phthalic acid monoester, prepared as described above, was prepared by reacting the monoester with concentrated ammonium hydroxide solution. 20% and 10% water solutions of this ammonium salt, each of which contained 2% emulsified wax, were impregnated into cellulose sheets. After drying, the sheets contained 29 and 17% impregnated solids and lost 83 and 50%, respectively, of their original property to expand and contract under varying humidity in the atmosphere.

Example 30

A mixture composed of 155 parts of ethylene glycol and 485 parts of a melted mixture of a commercial form of azelaic consisting of 87.5% azelaic acid and 12.5% undecanedioic acid having an average molecular weight of 194 was agitated and heated at a temperature of 145–155° C. for 3½ hours when titrimetric analysis indicated one-half of the original acidity had been used up by the reaction. The product was a viscous, red-brown liquid having an acid number of 248.

The product of this reaction, which consists predominantly of ethylene glycol-azelaic acid monoester, was reacted with ammonium hydroxide solution to form the ammonium salt. This salt was dissolved in water to form 20% solutions which also contained 2, 4 and 6% emulsified wax. These solutions were impregnated into unsized cellulose fiber board 0.060" thick. After drying and heating, the sheets contained 29, 30 and 28%, respectively, of impregnated solids and lost 84, 75 and 70%, respectively, of their original property of expanding and contracting when subjected to a relative humidity change ranging between 0 to 90% at 70° F. These boards absorbed 33, 42 and 22% water, respectively, after soaking for 2 hours in a water bath while the original sheet absorbed 123% of water under identical conditions.

Example 31

A 10% solution of the ammonium salt of Example 29 containing 3% emulsified wax was impregnated into cellulose fiber sheets. The sheets, after drying and heating, contained 21% impregnated solids and they lost 58% of the original expansion-contraction, and absorbed 47% water during a 2 hour water immersion period.

Example 32

190 parts of propylene glycol were added to a melted acid mixture containing 485 parts of 87.5% azelaic acid and 12.5% undecanedioic acid. Agitation and heating were carried on and the temperature was kept at 140–150° C. for 4 hours when titration of reaction mixture sample against standardized alkali solution indicated one-half of the original acidity had been consumed.

The monoester of this example was a soft, brown solid having an acid number of 243. The ammonium salt of this monoester was dissolved in water to form two 20% solutions, one of which also contained 3% and the other 4% of emulsified wax. These solutions were impregnated into cellulose fiber sheets which contained, after drying and heating for 1 hour at 108° C., 30 and 31% impregnated solids, respectively, and lost 85 and 93%, respectively, of their original expansion-contraction property. After a 2 hour water immersion they absorbed 62 and 29% water, respectively, while the original unimpregnated sheet absorbed 120% of water under similar conditions.

Example 33

Two 10% water solutions of ammonium salt of Example 32, which contained 4 and 6% emulsified wax, respectively, were impregnated into cellulose fiber sheets. After drying and heating, the sheets contained 21 and 20%, respectively, impregnated solids and lost 51 and 54%, respectively, of their original expansion-contraction property. They absorbed 51 and 33% water, respectively, after a 2 hour immersion period.

Example 34

Aqueous solutions containing 30 and 15% of the ammonium salt of diethylene glycol-sebacic acid monoester were impregnated into cellophane film. After drying and heating, the cellophane film contained 22 and 11%, respectively, of the stabilizer and lost 42 and 21%, respectively, of its original expansion-contraction in the direction perpendicular to the molecular orientation.

Example 35

A 25% water solution of the ammonium salt of diethylene glycol-sebacic acid monoester, which also contained 5% water soluble urea-formaldehyde, was impregnated into cellophane film. After drying and heating, the film contained 28% impregnated solids and lost 41% of its original expansion-contraction perpendicular to the molecular orientation.

Example 36

A 25% water solution of the ammonium salt of diethylene glycol-sebacic acid monoester, which also contained 5% water soluble phenol-formaldehyde resin was impregnated into cellophane film. After drying and heating, the film contained 21.4% impregnated solids and lost 40% of its original expansion-contraction perpendicular to the molecular orientation.

Example 37

An aqueous solution containing 30% of the ammonium salt of diethylene glycol-sebacic acid monoester was impregnated into gabardine cloth woven from regenerated cellulose fibers. After drying and heating, the cloth contained 32% stabilizer and lost 73% of the expansion-contraction in the direction parallel to the bolt hem and 79% of the original expansion-contraction in the perpendicular direction under varying relative humidity in the atmosphere.

Example 38

An aqueous solution containing 20% of the ammonium salt of diethylene glycol-sebacic acid monoester and 10% water-soluble urea-formaldehyde resin was impregnated into regenerated cellulose cloth. After drying and heating, the cloth contained 30% impregnated solids and lost 41% of the expansion-contraction in the parallel direction and 82% in the perpendicular direction.

Example 39

Solutions containing 20 and 10% of the ammonium salt of diethylene glycol-sebacic acid monoester and 10 and 5%, respectively, of water soluble melamine-formaldehyde resin, were impregnated into regenerated cellulose gabardine cloth. After drying and heating, the cloths contained 32 and 18%, respectively, impregnated solids, and they lost 100 and 41%, respectively, of their original expansion-contraction in the parallel direction and 98 and 63% in the perpendicular direction.

Example 40

604.8 parts of abietic acid and 206 parts of maleic anhydride were heated and stirred for 1½ hours at 150° C. The adduct thus formed was reacted at 150° C. with 800 parts of polyethylene glycol having an average molecular weight of 400 until one-third of the original acidity of the mixture was consumed in the monoester formation. The product was a light amber colored semi-solid resin.

90 parts of the monoester of this example was dissolved in 180 parts of water to which 30 parts of concentrated ammonium hydroxide had been added. Clear neutral solutions of the ammonium salt containing 20 and 10% solids were prepared by dilution of the original solution with water. Samples of kraft paper impregnated with these solutions and heated at a temperature of 108–130° C. for a period of one hour possessed improved stiffness and dimensional stability under varying humidity in the atmosphere.

Example 41

90 parts of a 30% aqueous solution of the ammonium salt of polyethylene glycol 200-adipic acid monoester was mixed with 10 parts of an emulsion of butadiene-acrylonitrile copolymer, known as Hycar Latex 1502×419. Sheets of photographic paper impregnated with the mixture showed, after drying and heating at 108° C., dimensional stability, fold endurance and resistance to ink and water penetration.

D. AMMONIUM AND VOLATILE AMINE SALTS OF POLYACID ESTERS OF POLYCARBOXYLIC ACIDS AND POLYHYDRIC ALCOHOLS

Example 42

906 parts of commercial abietic acid (3.1 mols) and 309 parts of maleic anhydride (3.0 mols) were charged into a vessel and heated until the charge was melted. The heating of the molten mass at 150° C. with stirring was continued for 1½ hours, at which time a sample of the reacting mixture showed a negative test for abietic acid. 114 parts of propylene glycol (1.5 mols) was added to the adduct thus prepared and the mixture was reacted at 150° C. until one-third of the original acidity was consumed in the formation of the di-adduct ester of propylene glycol. The product was a light amber colored brittle resin.

120 parts of the product described in this example was dissolved in a mixture composed of 200 parts of water and 80 parts of concentrated ammonium hydroxide solution (29% $NH_3$). The pH of the solution was 8. The solution could be diluted with water to 13% concentration of solids without formation of turbidity. Samples of sulfite paper impregnated with the ammoniacal solutions of the ester of this example and subsequently dried between 108–127° C. possessed stiffness and showed improved dimensional stability under varying conditions of humidity in the atmosphere.

Example 43

To 1,184 parts of melted phthalic anhydride was added 424 parts of diethylene glycol. Agitation was begun with gentle heating. The temperature was maintained at 150–160° C. for 40 minutes when titrimetric analysis indicated one-half of the original acidity had been consumed. The product was a viscous, pale yellow liquid having an acid number of 297.

Two solutions containing 20% of the ammonium salt of the diethylene glycol diphthalic acid ester, so formed, and 4 and 3%, respectively, of emulsified wax, were impregnated into cellulose fiber board. After drying and heating, the boards contained 26 and 22% impregnated solids. They lost 48 and 53%, respectively, of their original expansion-contraction under variation in humidity conditions and absorbed 34 and 27%, respectively, of water during a 2 hour immersion period, while the original unimpregnated sheet absorbed 96% of water under identical conditions.

Example 44

White pine wood was impregnated with a 30% aqueous solution of the ammonium salt of diethylene glycol diphthalic acid ester, prepared as outlined in Example 43. After drying and heating for 1 hour at 108° C., the wood contained 20% stabilizer and its contraction and expansion was reduced by 81% in length direction, 50% in width direction, and 74% in thickness direction under varying relative humidity as compared to those of unimpregnated wood dried and heated in identical manner.

Example 45

196 parts of maleic anhydride were dissolved with stirring in 400 parts of polyethylene glycol 400 kept at a temperature of 80° C. The stirring was then maintained for 1 hour and 15 minutes while heating at 110–130° C. when titrimetric analysis indicated one-half of the original acidity had been consumed by the reaction. The product, polyethylene glycol 400 dimaleic acid ester, was a viscous, dark red liquid having an acid number of 205.

An aqueous solution of the ammonium salt of polyethylene glycol 400 dimaleic acid ester was prepared by adding concentrated ammonium hydroxide solution to a mixture of the ester and the desired amount of water until its pH was 7.

Unsized cellulose fiber sheets were impregnated with 20 and 10% water solutions of the ammonium salt of polyethylene glycol 400 dimaleic acid ester. After drying and heating, the sheets contained 28 and 16%, respectively, of stabilizer and lost 70 and 34%, respectively, of their normal expansion and contraction when subjected to a relative humidity change from 0 to 90%.

Example 46

Aqueous solutions containing 20 and 10% of the ammonium salt of polyethylene glycol 400 dimaleic acid ester and 3% emulsified wax were impregnated into cellulose fiber boards. After evaporation of solvents and drying, the boards contained 26 and 16%, respectively, impregnated solids and lost 66 and 37%, respectively, of their original expansion-contraction property.

Example 47

Aqueous solutions containing 15 and 10% of the ammonium salt of diethylene glycol dimaleic acid ester and 11 and 7%, respectively, of water soluble urea-formaldehyde resin, were impregnated into cellulose fiber boards. After drying and heating the boards contained 28 and 23% impregnated solids and lost 47 and 32%, respectively, of their original expansion-contraction property.

Example 48

114 parts of propylene glycol were mixed with 438 parts of melted adipic acid, and were stirred and heated at 155–165° C. for 4 hours when titration of a reaction mixture sample with standardized alkali solution indicated one-half of the original acidity had been used up. The product was a tan, waxy solid having an acid number of 369.

Aqueous solutions containing 20 and 10% of the ammonium salt of propylene glycol diadipic acid ester, so formed, were impregnated into cellulose fiber sheets. After drying, the sheets contained 28 and 18% stabilizer and lost 78 and 46%, respectively, of their original expansion-contraction over a range of from 0 to 90% relative humidity.

Example 49

Aqueous solutions containing 20 and 10% of the ammonium salt of the ester of Example 48 and 3% emulsified wax were impregnated into cellulose fiber sheets. After drying and heating, the sheets contained 27 and 17%, respectively, of impregnated solids and lost 73 and 44%, respectively, of their original tendency to expand and contract.

Example 50

Aqueous solutions containing 15 and 10% of the ammonium salt of the ester of Example 48 and 15 and 10%, respectively, of water soluble urea-formaldehyde resin were impregnated into cellulose fiber sheets. The dried sheets contained 38 and 27%, respectively, of impregnated solids and lost 51 and 47%, respectively, of their original property to expand and contract over a relative humidity range of from 0 to 90%.

Example 51

93 parts of ethylene glycol were mixed with 439 parts of melted adipic acid. A temperature of 160 to 170° C. was maintained for 4 hours and 30 minutes with agitation. At that time, titrimetric analysis indicated one-half of the original acidity had been consumed. The product was a tan, waxy solid having an acid number of 367.

An aqueous solution containing 10% of the diethylamine salt of the ethylene glycol diadipic acid ester, so formed, was impregnated into an unsized cellulose fiber sheet. The dried sheet, after heating, contained 17% stabilizer and lost 41% of its original expansion-contraction property.

Example 52

An aqueous solution containing 8% of the diethylamine salt of ethylene glycol diadipate, and 3% emulsified wax, was impregnated into cellulose fiber sheets. The dried sheets contained 16% impregnated solids and lost 53% of their original expansion-contraction.

Example 53

Cellulose fiber sheets were impregnated with 15 and 10% aqueous solutions of the diethylamine salt of ethylene glycol diadipate, which also contained 15 and 10%, respectively, of water soluble urea-formaldehyde resin. The dried sheets contained 38 and 29%, respectively, impregnated solids, and lost 49 and 43%, respectively, of their original expansion-contraction property.

Example 54

Aqueous solutions containing 11 and 9% of the diethylamine salt of ethylene glycol diadipate, and 11 and 9%, respectively, of water soluble cresol-formaldehyde resin were impregnated into cellulose fiber sheets. After drying and heating, the sheets contained 33 and 28%, respectively, of impregnated solids and lost 70 and 59%, respectively, of their original expansion-contraction property over a range of from 0 to 90% relative humidity.

Example 55

194 parts of 95% glycerol mixed with 585 parts of melted adipic acid were stirred and heated at a temperature of 145–155° C. for 3 hours when titration against standardized alkali solution indicated one-half of the original acidity present had been consumed. The product was a white, waxy solid, having an acid number of 314.

The glycerol diadipate thus prepared was combined with triethylamine to form a water soluble salt.

A 20% aqueous solution of the triethylamine salt of glycerol diadipate was impregnated into cellulose fiber sheets. The dried sheets, after heating, contained 28% stabilizer and lost 58% of their original expansion and contraction when they were subjected to relative humidity variation of from 0 to 90%.

Example 56

Aqueous solutions containing 20 and 10% of the triethylamine salt of glycerol diadipate, and 4% emulsified wax, were impregnated into cellulose fiber sheets. After drying and heating, the sheets contained 31 and 21%, respectively, of impregnated solids and lost 65 and 36%, respectively, of their original expansion-contraction under varying humidity conditions.

Example 57

Cellulose fiber sheets were impregnated with 20 and 10% aqueous solution of the triethylamine salt of glycerol diadipate, which also contained 18 and 9%, respectively, of water soluble urea-formaldehyde resin. After drying and heating, the sheets contained 43 and 26%, respectively, of impregnated solids and lost 66 and 45%, respectively, of their original expansion-contraction properties.

Example 58

Cellulose fiber sheets were impregnated with a 20% aqueous solution of the ammonium salt of glycerol diadipate, containing also 13% water soluble phenol-formaldehyde resin. After drying and heating, the sheets contained 39% impregnated solids and lost 66% of their original expansion-contraction characteristic.

Example 59

106 parts of diethylene glycol were mixed with 404 parts of melted sebacic acid. The resulting dark brown solution was stirred and heated at a temperature of 170–180° C. for 3 hours and 15 minutes. At that time, titration of a reaction mixture sample showed one-half of the original acidity had been consumed. The product was a tan, waxy solid having an acid number of 234. The diethylene glycol disebacate, prepared as described above, was combined with concentrated ammonium hydroxide solution to form the water soluble ammonium salt.

Cellophane film was impregnated with a 30% water solution of the ammonium salt of diethylene glycol disebacate. After drying and heating, the film contained 25% stabilizer and lost 57% perpendicular to the direction of molecular orientation.

Example 60

Gabardine woven from regenerated cellulose fibers was impregnated with a 30% aqueous solution of the ammonium salt of diethylene glycol disebacate. The cloth after drying contained 37% stabilizer and showed a reduction of 94% in expansion-contraction due to changes in relative humidity of from 0 to 90% in the direction parallel to the bolt hem and a reduction of 100% in the perpendicular direction.

Example 61

A water solution containing 20% of the ammonium salt of diethylene glycol disebacate and 10% water soluble urea-formaldehyde resin was impregnated into regenerated cellulose gabardine cloth. After drying and heating, the cloth contained 36% impregnated solids and lost 80% of its original expansion-contraction in the direction parallel to the bolt hem and 72% in the perpendicular direction.

Example 62

A 30% aqueous solution of the ammonium salt of diethylene glycol diadipate, prepared by reacting the ester of this example with ammonium hydroxide, was impregnated into regenerated cellulose gabardine cloth. After drying and heating, the cloth contained 35% stabilizer and lost 72% of the normal expansion-contraction in the direction parallel to the bolt hem and 98% in the perpendicular direction.

Example 63

Aqueous solutions containing 20 and 10% of the ammonium salt of diethylene glycol diadipate, and 10 and 5%, respectively, of water soluble urea-formaldehyde resin, were impregnated into regenerated cellulose gabardine cloth. After drying and heating, the cloth contained 35 and 19%, respectively, of impregnated solids and lost 79 and 45%, respectively, of the original expansion-contraction parallel to the bolt hem and 83 and 51%, respectively, of the expansion-contraction in the perpendicular direction.

Example 64

Regenerated cellulose gabardine cloth was impregnated with aqueous solutions containing 20 and 10% of the ammonium salt of diethylene glycol diadipate salt, and 10 and 5%, respectively of water soluble melamine-formaldehyde thermosetting resin. After drying and heating, the cloth contained 31 and 17%, respectively, of the original expansion-contraction in the direction parallel to the bolt hem and lost 86 and 79%, respectively, in the perpendicular direction.

Example 65

900 parts of phthalic anhydride was heated in a vessel at 150° C. until it melted. While stirring the molten phthalic anhydride and maintaining the temperature of 140–150° C., 188 parts of ethylene glycol were added. The stirring of the reacting mixture at 150° C. was continued for approximately 20 minutes. At the end of that time, the titration of a sample indicated that one-half of the originally available acidity was consumed in the ester formation.

The mixture was cooled to 135° C. and poured with stirring into 1,088 parts of water kept at room temperature, and containing a theoretical quantity of ammonia required for the formation of the diammonium salt of ethylene glycol diphthalate. On cooling, the resulting clear, colorless solution had a pH of 5.2. The solution could be further diluted with water to about 10% of solids concentration without clouding. The clouding of solutions at higher dilutions was eliminated by the addition of small quantities of ammonium hydroxide.

Samples of 0.007" thick paper used in the manufacture of tabulating cards were impregnated with aqueous solutions of two different concentrations of the ammonium salt of ethylene glycol diphthalate. One of the impregnated samples after heating at 127° C. for 1 hour contained 18% stabilizer and lost 60% of its normal contraction and expansion under varying humidity in the atmosphere. Another sample containing after heating 13% of the stabilizer lost 45% of contraction and expansion under identical conditions.

*Example 66*

2,072 parts of phthalic anhydride was heated in a vessel at 150-160° C. for 20 minutes with 523.6 parts of propylene glycol. After cooling the product to 140° C., the titration of the sample showed that one-half of the original acidity was consumed in the formation of the propylene glycol diphthalate. The product was a colorless semi-solid resin at room temperature. The ammonium salt solution was prepared by pouring 1,550 grams of the above reaction product at 140° C. into a mixture kept at room temperature and composed of 471 parts of concentrated ammonium hydroxide (29% NH$_3$) and 900 grams of water. The solution temperature of the resulting clear colorless solution was 90° C. It contained 58% of the ammonium salt of propylene glycol diphthalate and on cooling to room temperature had a pH of 5.1.

Samples of so-called "negative paper" made from 100% rag fibers were impregnated with solutions of various concentrations of the ammonium salt of the ester described in this example. After heating for 1 hour at 107° C. the samples contained 23, 21, 19 and 14% of the stabilizer and lost 85, 73, 61 and 41%, respectively, of their normal contraction and expansion occurring with variation of humidity in surrounding atmosphere.

*Example 67*

701.5 parts of phthalic anhydride and 214 parts of butanediol-1,4 were heated at 135-150° C. until titration of sample indicated that reaction for formation of butanediol diphthalic acid ester was completed. The product was a dark amber colored semi-solid resin.

The ammonium salt of the product was prepared by melting 240 parts and pouring them into a mixture composed of 453 parts of water and 107 parts of concentrated ammonium hydroxide (29% NH$_3$).

Samples of sulfite pulp paper impregnated with the ammonium salt solution of the ester of this example contained 20% stabilizer after heating for 1 hour at 108-130° C. Evaluation of their dimensional stability showed that over 50% of their original contraction and expansion normally occurring under varying humidity in the atmosphere was removed.

*Example 68*

1,218 parts of maleic anhydride-abietic acid adduct and 159 parts of diethylene glycol was reacted at 150° C. with stirring until one-third of the orginal acidity was consumed in the formation of diethylene glycol di-adduct ester.

200 parts of the ester, so formed, was dissolved in 600 parts of aqueous solution containing 99 parts of concentrated ammonium hydroxide (29% NH$_3$) solution and a small quantity of antifoaming agent. Clear solutions of lower concentration were prepared by diluting the original solution with water and adding when required small additional quantities of ammonium hydroxide solution.

Samples of wood pulp paper impregnated with these solutions, and subsequently heated at 108-130° C., showed improved dimensional stability under varying humidity in the atmosphere.

*Example 69*

90 parts of a 30% aqueous solution of the ammonium salt of diethylene glycol diphthalate was mixed with 10 parts of synthetic rubber emulsion containing 40 parts of butadieneacrylonitrile copolymer, known to the trade as Hycar Latex 1502X419. Sheets of photographic paper impregnated with the mixture showed, after drying and heating at 108° C., improved dimensional stability, fold endurance and resistance to ink and water penetration.

Thus, I have disclosed an economical and safe process for dimensionally stabilizing cellulose materials and novel compounds and compositions of matter for use in such a process. Aside from the stability to humidity change, other desirable properties are imparted to the treated articles.

It has already been pointed out that inclusion of a thermosetting resin or waterproofing agent gives added water resistance to the final product. It might be expected that when a thermosetting resin is included in the treating composition, a much stiffer product would result. However, the stabilizing compounds, particularly the partial esters, have been found to exert a pronounced plasticizing effect on synthetic resins, both thermoplastic and thermosetting and therefore the final products, which would contain a mixture of resin and stabilizer are quite flexible in nature. In fact, the stabilizers alone have been found to impart a certain softness to paper, cardboard and textile products into which they are impregnated.

It has also been found that the present process imparts antistatic and abrasion-resistant properties to paper products.

I claim:

1. The process of dimensionally stabilizing cellulose subject to varying humidity conditions comprising impregnating said cellulose with an aqueous solution of a salt formed by reacting a basic compound selected from the group consisting of ammonia and a low molecular weight aliphatic monoamine having a boiling point below 100° C. with an organic compound having a plurality of hydroxyl groups attached to different carbon atoms in the molecule, at least one of the hydroxyl groups being part of a carboxyl group, said organic compound being selected from the group consisting of a polycarboxylic acid, a hydroxymonocarboxylic acid, a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a partial ester of a polyhydric alcohol and a polycarboxylic acid, said last-mentioned ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid; and heating said cellulose to dry it and drive off said basic compound, said cellulose being impregnated with a sufficient amount of said solution that the dried impregnated cellulose contains from about 2–50% by weight of said organic compound.

2. The process of dimensionally stabilizing cellulose subject to varying humidity conditions comprising impregnating said cellulose with an aqueous solution of the ammonium salt of an organic compound having a plurality of hydroxyl groups attached to different carbon atoms in the molecule, at least one of the hydroxyl groups being part of a carboxyl group, said organic compound being selected from the group consisting of a polycarboxylic acid, a hydroxymonocarboxylic acid, a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a partial ester of a polyhydric alcohol and a polycarboxylic acid, said last-mentioned ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid; and heating said impregnated cellulose to dry it and drive off ammonia, said cellulose being impregnated with a sufficient amount of said solution that the dried impregnated cellulose contains from about 2–50% by weight of said organic compound.

3. The process of claim 2 in which said aqueous solution also contains a sufficient amount of a water-soluble thermosetting resin selected from the group consisting of a urea-formaldehyde resin, a melamine-formaldehyde resin, and a phenol-formaldehyde resin that the resulting dried impregnated cellulose will contain from about 5–50% by weight of said thermosetting resin.

4. The process of dimensionally stabilizing cellulose subject to varying humidity conditions comprising impregnating said cellulose with an aqueous solution of the ammonium salt of a polycarboxylic acid and heating said impregnated cellulose to dry it and drive off ammonia, said cellulose being impregnated with a sufficient amount of said solution that the dried, impregnated cellulose contains from about 2 to 50% by weight of said polycarboxylic acid.

5. The process of dimensionally stabilizing cellulose subject to varying humidity conditions comprising impregnating said cellulose with an aqueous solution of the ammonium salt of sebacic acid and heating said impregnated cellulose to dry it and drive off ammonia, said cellulose being impregnated with a sufficient amount of said solution that the dried, impregnated cellulose contains from about 2 to 50% by weight of sebacic acid.

6. The process of dimensionally stabilizing cellulose subject to varying humidity conditions comprising impregnating said cellulose with an aqueous solution of the ammonium salt of a hydroxy monocarboxylic acid and heating said impregnated cellulose to dry it and drive off ammonia, said cellulose being impregnated with a sufficient amount of said solution that the dried, impregnated cellulose contains from about 2 to 50% by weight of said hydroxy monocarboxylic acid.

7. The process of dimensionally stabilizing cellulose subject to varying humidity conditions comprising impregnating said cellulose with an aqueous solution of the ammonium salt of dihydroxy stearic acid and heating said impregnated cellulose to dry it and drive off ammonia, said cellulose being impregnated with a sufficient amount of said solution that the dried, impregnated cellulose contains from about 2 to 50% by weight of said dihydroxy stearic acid.

8. The process of dimensionally stabilizing cellulose subject to varying humidity conditions comprising impregnating said cellulose with an aqueous solution of the ammonium salt of a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and heating said impregnated cellulose to dry it and drive off ammonia, said cellulose being impregnated with a sufficient amount of said solution that the dried, impregnated cellulose contains from about 2 to 50% by weight of said partial ester.

9. The process of claim 8 in which said partial ester is polyethylene glycol 200-adipic acid monoester.

10. The process of claim 8 in which said partial ester is ethylene glycol-sebacic acid monoester.

11. The process of dimensionally stabilizing cellulose subject to varying humidity conditions comprising impregnating said cellulose with an aqueous solution of the ammonium salt of a partial ester of a polyhydric alcohol and a polycarboxylic acid, said ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid, and heating said impregnated cellulose to dry it and drive off ammonia, said cellulose being impregnated with a sufficient amount of said solution that the dried, impregnated cellulose contains from about 2 to about 50% by weight of said partial ester.

12. The process of claim 11 in which said partial ester is ethylene glycol diadipic acid ester.

13. A composition of matter for dimensionally stabilizing cellulose subject to varying humidity conditions comprising an aqueous solution of a water-soluble thermosetting resin selected from the group consisting of a urea-formaldehyde resin, a melamine-formaldehyde resin, and a phenol-formaldehyde resin and the ammonium salt of an organic compound having a plurality of hydroxyl groups attached to different carbon atoms in the molecule with at least one of the hydroxyl groups being part of a carboxyl group, said organic compound being selected from the group consisting of a polycarboxylic acid, a hydroxymonocarboxylic acid, a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a partial ester of a polyhydric alcohol and a polycarboxylic acid, said last-mentioned ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

14. A composition of matter for dimensionally stabilizing cellulose subject to varying humidity conditions comprising an aqueous solution of the ammonium salt of a polycarboxylic acid and a water-soluble thermosetting resin selected from the group consisting of a urea-formaldehyde resin, a melamine-formaldehyde resin and a phenol-formaldehyde resin.

15. A composition of matter for dimensionally stabilizing cellulose subject to varying humidity conditions comprising an aqueous solution of the ammonium salt of a hydroxymonocarboxylic acid and a water-soluble thermosetting resin selected from the group consisting of a urea-formaldehyde resin, a melamine-formaldehyde resin and a phenol-formaldehyde resin.

16. A composition of matter for dimensionally stabilizing cellulose subject to varying humidity conditions comprising an aqueous solution of the ammonium salt of a partial ester of a polyhydric alcohol and a polycarboxylic acid, said ester containing only one polyhydric alcohol residue and only one polycarboxylic acid residue and said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a water-soluble thermosetting resin selected from the group consisting of a urea-formaldehyde resin, a melamine-formaldehyde resin and a phenol-formaldehyde resin.

17. The composition of claim 16 in which said partial ester is polyethylene glycol 200-adipic acid monoester.

18. The composition of claim 16 in which said partial ester is ethylene glycol-sebacic acid monoester.

19. A composition of matter for dimensionally stabilizing cellulose subject to varying humidity conditions comprising an aqueous solution of the ammonium salt of a partial ester of a polyhydric alcohol and a polycarboxylic acid, said ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping the reaction after the acidity has been reduced by a fraction of $1/n$ where $n$ is the number of carboxyl groups in the said polycarboxylic acid; and a water-soluble thermosetting resin selected from the group consisting of a urea-formaldehyde resin, a melamine-formaldehyde resin and a phenolformaldehyde resin.

20. A composition of matter for dimensionally stabilizing cellulose subject to varying humidity conditions comprising an aqueous solution of the ammonium salt of a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid.

21. A composition of matter for dimensionally stabilizing cellulose subject to varying humidity conditions comprising an aqueous solution of the ammonium salt of a partial ester of a polyhydric alcohol and a polycarboxylic acid, said ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

References Cited in the file of this patent
UNITED STATES PATENTS

| | | |
|---|---|---|
| 1,780,375 | Bradley | Nov. 4, 1930 |
| 2,288,413 | Morgan | Aug. 2, 1938 |
| 2,329,651 | Powers | Sept. 4, 1943 |
| 2,559,260 | Schick et al. | July 3, 1951 |
| 2,602,088 | De Groote | July 1, 1952 |
| 2,626,958 | De Groote | Jan. 27, 1953 |
| 2,629,701 | Ericks | Feb. 24, 1953 |